United States Patent Office 3,127,469
Patented Mar. 31, 1964

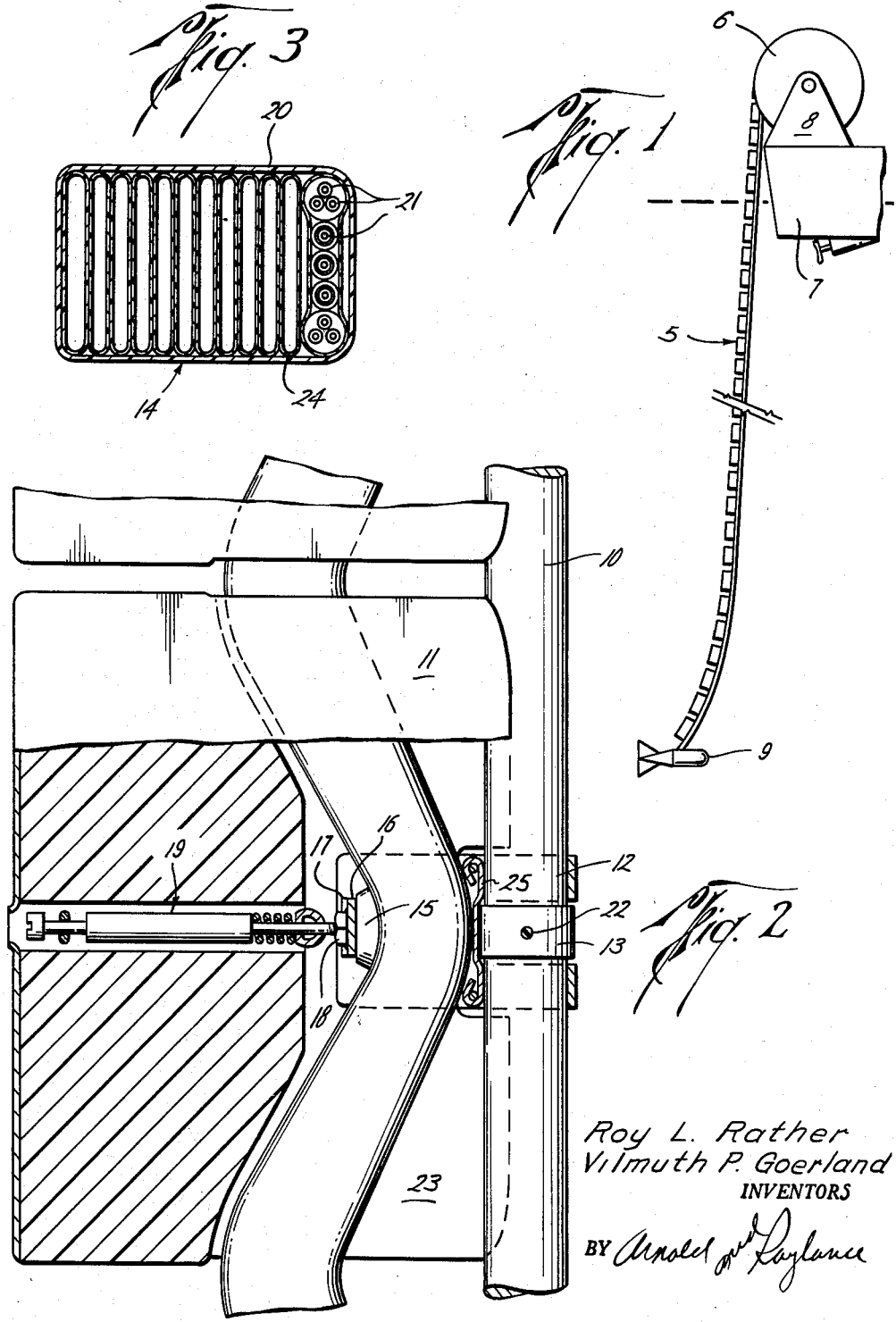

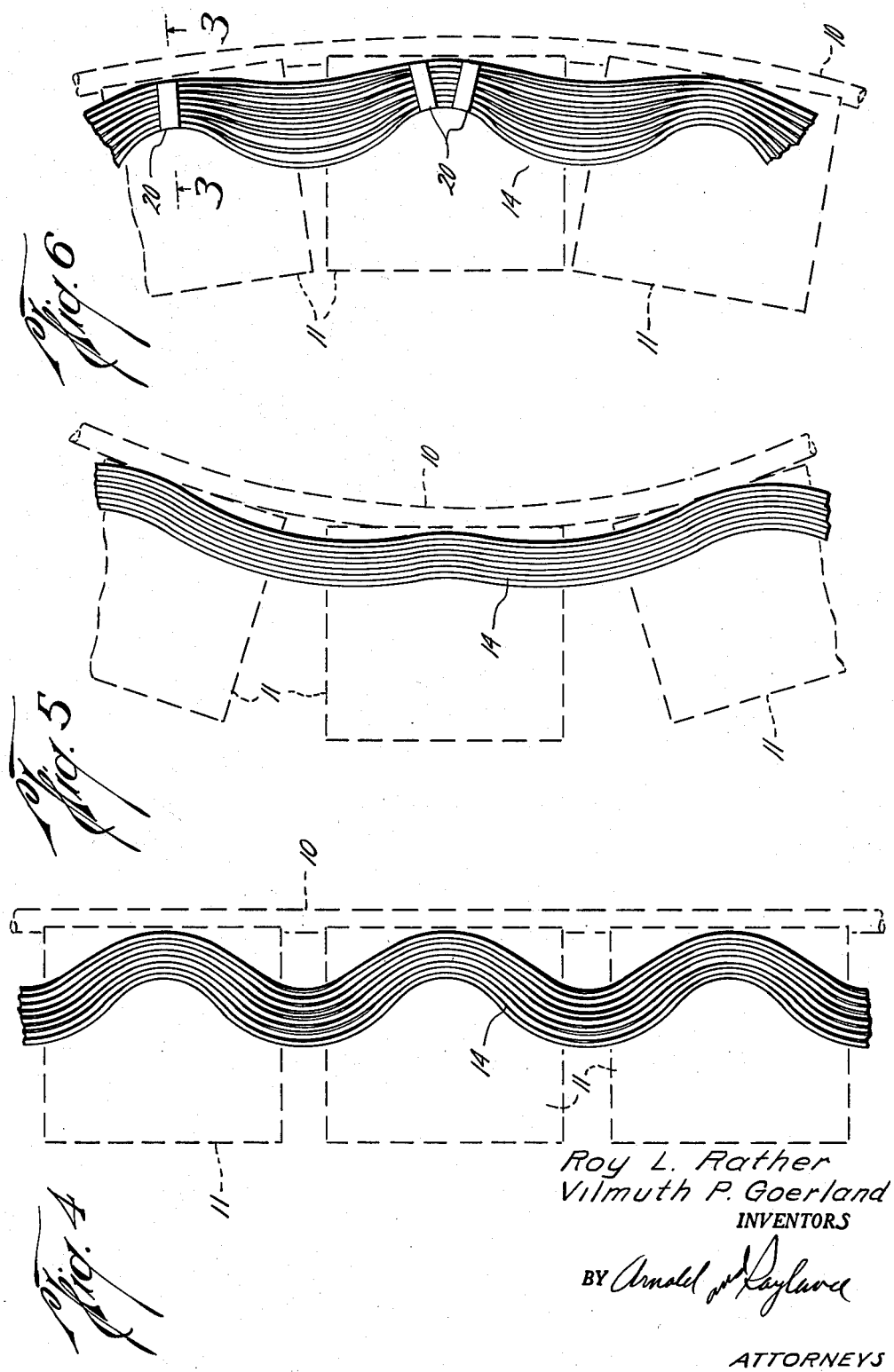

3,127,469
FLEXIBLE TOWLINE WITH ELECTRICAL
CONDUCTOR HARNESS
Roy L. Rather and Vilmuth P. Goerland, Houston, Tex.,
assignors to Commercial Engineering Corporation,
Houston, Tex., a corporation of Texas
Filed Feb. 28, 1962, Ser. No. 176,317
6 Claims. (Cl. 174—70)

This invention relates to an electrical assembly and is particularly concerned with an electrical harness capable of employment with a flexible tow-line.

In situations such as oceanographic exploration, one or more electrical instruments must be towed at the end of a flexible line and it is necessary to connect a great many electrically conductive wires between the object or objects being towed and the towing vehicle. Since electrically conductive wires are lacking in tensile strength it is necessary to provide both a load bearing line or cable and an electrical cable or harness.

For many years, this was done by integrating into one cable, both the load bearing strands and the conductive strands. This could be done either by winding the strands together or by winding the conductive strands into a core around which the load bearing strands were then wound. The difficulty with this system was that the load still imposed destructive strain upon the conductive strands which were soon broken, necessitating replacement of the entire cable, since it was impractical to replace only the conductive strands.

More recently, it has been the practice to employ separate load bearing and conductive cables to facilitate replacement of the conductive cable only. Further, where separate cables are used, the conductive cable, which is of course carried by the load bearing cable, is frequently disposed along the load cable in serpentine fashion in order to minimize the strain which would be imposed upon the conductive cable by stretching and flexing of the load cable. Even so, the conductive cable, which is of course "bundled" or twisted still deteriorates, altogether too rapidly, primarily because of the stress and strain inherently imposed upon the strands of a twisted or "bundled" cable when it is flexed.

It is an object of this invention to provide a conductive cable or harness of the type described which is adapted to intermittent slacked securement to a load-bearing towline and which can be flexed without imposing upon the individual strands that strain which is inherent in harness of the twisted or "bundled" type.

In general, the conductive harness of this invention comprises a multiplicity of separately insulated electrically conductive wires contained in generally side by side relation in several flat sheaths or strips. The strips are then arranged in stacked or overlying relation and bound together at intermittent or spaced points in such a manner that each of the stacked strips will assume an undulated shape and the undulations in each adjacent strip will be of successively different degree.

To further facilitate an understanding of the present invention one particular embodiment thereof has been illustrated in the appended drawings.

In the drawings:

FIGURE 1 illustrates a faired tow-line secured to a reel at the fantail of a vessel and towing an oceanographic instrument.

FIGURE 2 schematically illustrates the manner in which an electrical harness embodying this invention may be carried in the fairing members of an oceanographic tow-line.

FIGURE 3 is a section through line 3—3 of FIGURE 6.

FIGURE 4 is a schematic showing the tow-line and harness in relaxed position.

FIGURE 5 is a schematic showing the tow-line and harness flexed in one direction.

FIGURE 6 is a schematic showing the tow-line and harness flexed in the opposite direction.

Reference numerals have been employed as follows:

5, faired tow-line
6, drum
7, vessel
8, frame
9, instrument
10, cable
11, fairing
12, bracket
13, collar
14, electrical harness
15, resilient pad
16, cross-member
17, slot
18, nut
19, retention bolt assembly
20, binding
21, insulated conductors
22, pin
23, passageways
24, flat tubular strips
25, butt plate In the illustrated embodiment, a faired tow-line, generally indicated at 5, is conveniently secured, at one end, to a rotatable drum, or reel, 6. In turn, drum 6 is carried by frame 8 at the fantail of vessel 7. Thus, an oceanographic instrument capsule 9 may be conveniently towed through a body of water by securement to the free end of line 5 which may be easily "payed-out" or "brought-in" by means of drum 6.

To insure proper "drag" characteristics load-bearing cable 10 of line 5 is equipped with fairings 11 each of which is secured to cable 10 at a predetermined point by means of retention bolt assembly 19 which threads into nut 18. In turn, nut 18 is conveniently secured to cross-member 16, as by welding. Cross-member 16 is then carried by bracket 12 by means of opposing slots 17. Bracket 12, as indicated in FIGURE 2, loops cable 10 adjacent collar 13 which is fixed to cable 10 as by pin 22 to hold the entire assembly against longitudinal displacement along cable 10.

Electrical communication between vessel 7 and capsule 9 is achieved by means of harness 14 which extends through longitudinally aligned passageways 23 of fairings 11. Harness 14 is made up of a plurality of insulated conductors 21, which may of course be of common or different diameters, as desired, held in side-by-side groupings by means of flat tubular strips 24. Strips 24 are then arranged in stacked relation and secured together at longitudinally spaced intervals, as by means of tape 20, to undulate strips 24 to successively different degrees. Harness 14 is then extended through passageways 23 and secured therein, in undulated relation to load cable 10, as by clamping between resilient pad 15 and butt plate 25 of bracket 12, and may provide one or more undulations per fairing, as desired.

Thus, as shown schematically in FIGURE 4, harness 14 will be carried by load cable 10 in generally serpentine relation thereby eliminating from harness 14 the strain of its own weight. More important however, arrangement of strips 24 in undulations of successively different degrees will, as shown schematically in FIGURES 5 and 6, permit each of tapes 20, and hence each of conductors 21, to flex independently of the other thereby obviating the stress and/or strain which is inherent in twisted or bundled conductive cables.

What is claimed is:

1. An electrical conductor assembly comprising, in combination;
   a flexible tow line;
      fairing members spaced along said tow line and provided with longitudinally aligned passageways;
      a plurality of flat, insulated conductors disposed in overlying relation and extending through said passageways;
         and securement means holding said conductors against relative longitudinal movement, at spaced points within said passageways, and in normally successively varying spaced relation, between said points.

2. The assembly of claim 1 wherein said tow line comprises a cable.

3. The assembly of claim 1 wherein said tow line comprises a link structure.

4. An electrical conductor assembly comprising, in combination;
   a flexible tow line;
      fairing members spaced along said tow line and provided with longitudinally aligned passageways;
      a plurality of flat, insulated conductors disposed in overlying relation and extending through said passageways;
         securement means holding said conductors against relative longitudinal movement at spaced points within said passageways.
      and binders holding said conductors together in overlying contacting relation adjacent said points and in overlying normally successively varying spaced relation between said points.

5. The assembly of claim 4 wherein said securement means comprises a clamping assembly.

6. The assembly of claim 4 wherein said binding means comprises at least one strip of adhesive tape.

References Cited in the file of this patent

UNITED STATES PATENTS

| | | |
|---|---|---|
| 1,477,596 | Rhodes | Dec. 18, 1923 |
| 2,143,649 | Dansard | Jan. 10, 1939 |
| 2,628,998 | Frisbie | Feb. 17, 1953 |
| 2,652,444 | Dansard | Sept. 15, 1953 |
| 2,805,472 | Botts et al. | Sept. 10, 1957 |
| 2,975,807 | Waninger | Mar. 21, 1961 |